US010384759B2

(12) United States Patent
Zuardy et al.

(10) Patent No.: US 10,384,759 B2
(45) Date of Patent: Aug. 20, 2019

(54) PRESSURE BULKHEAD FOR AN AIRCRAFT FUSELAGE (71) Applicant: Airbus Operations GmbH, Hamburg (DE)

(72) Inventors: Ichwan Zuardy, Hamburg (DE); Thomas Hoffmeister, Hamburg (DE); Axel Siegfried Herrmann, Hamburg (DE); Markus Müller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 413 days.

(21) Appl. No.: 15/361,292

(22) Filed: Nov. 25, 2016

(65) Prior Publication Data
US 2017/0137107 A1 May 18, 2017

Related U.S. Application Data (63) Continuation of application No. PCT/EP2015/061175, filed on May 20, 2015.

(30) Foreign Application Priority Data

May 26, 2014 (DE) ......................... 10 2014 107 404

(51) Int. Cl.
*B64C 1/10* (2006.01)
*B64C 1/06* (2006.01)

(52) U.S. Cl.
CPC ................ *B64C 1/10* (2013.01); *B64C 1/064* (2013.01)

(58) Field of Classification Search
CPC ..................................................... B64C 1/10
See application file for complete search history.

(56) References Cited

U.S. PATENT DOCUMENTS 5,899,412 A    5/1999  Dilorio et al.
6,213,426 B1*  4/2001  Weber .................. B64C 1/10
                                              244/117 R
(Continued)

FOREIGN PATENT DOCUMENTS

AT      405813 B    11/1999
CN    101466593 A    6/2009
(Continued)

OTHER PUBLICATIONS

German Search Report for Application No. 10 2014 107 404 dated Sep. 24, 2014.
(Continued)

*Primary Examiner* — Brian M O'Hara
(74) *Attorney, Agent, or Firm* — Jenkins, Wilson, Taylor & Hunt, P.A.

(57) ABSTRACT

A pressure bulkhead for an aircraft fuselage having a skin element, with a first surface and a second surface, a circumferential edge and a center axis, and a reinforcement assembly, which has radially disposed reinforcement elements extending along the first surface radially between an outer end at the edge of the skin element and an inner end, which faces the center axis, wherein, in a cross section, which extends radially along the center axis, each of the radially disposed reinforcement elements defines first and second contour lines, each extending from the outer end of the radially disposed reinforcement elements to the inner end thereof, and the reinforcement assembly resting with the first contour lines thereof on the first surface of the skin element. A pressure bulkhead for an aircraft fuselage can efficiently absorb occurring pressure loads.

16 Claims, 5 Drawing Sheets (56) References Cited

U.S. PATENT DOCUMENTS

| | | |
|---|---|---|
| 6,378,805 B1 | 4/2002 | Stephan et al. |
| 6,443,392 B2 | 9/2002 | Weber et al. |
| 8,033,503 B2 | 10/2011 | Basso |
| 8,524,352 B2 | 9/2013 | Forzan et al. |
| 8,596,578 B2 | 12/2013 | Noebel et al. |
| 2001/0025903 A1 | 10/2001 | Weber et al. |
| 2009/0242701 A1 | 10/2009 | Kondo |
| 2011/0290940 A1 | 12/2011 | Noebel et al. |
| 2013/0099057 A1 | 4/2013 | Martino et al. |
| 2014/0124622 A1 | 5/2014 | Boren et al. |
| 2015/0008285 A1 | 1/2015 | Zuardy et al. |

FOREIGN PATENT DOCUMENTS

| | | |
|---|---|---|
| DE | 60029963 T2 | 2/2007 |
| DE | 102010018933 A1 | 11/2011 |
| DE | 102012005451 A1 | 9/2013 |
| JP | 2009-541131 | 11/2009 |
| JP | 2010-504241 | 2/2010 |
| RU | 2472671 C1 | 1/2013 |
| WO | WO 99/24316 A1 | 5/1999 |
| WO | WO 2009/056729 | 5/2009 |

OTHER PUBLICATIONS

International Search Report and Written Opinion for Application No. PCT/EP2015/061175 dated Aug. 25, 2015.
Chinese Office Action for Application No. 201580035610.8 dated Jun. 13, 2018.
Chinese Office Action for Application No. 201580035610.8 dated Oct. 22, 2018.
Japanese Office Action and Search Report for Application No. 2016-569633 dated Mar. 19, 2019.

* cited by examiner

PRESSURE BULKHEAD FOR AN AIRCRAFT FUSELAGE

CROSS-REFERENCE TO RELATED APPLICATIONS

This application is a continuation of International Application No. PCT/EP2015/061175 filed May 20, 2015, which claims priority to German Patent Application No. 10 2014 107 404.1 filed May 26, 2014, the entire disclosures of which are incorporated by reference herein.

TECHNICAL FIELD

The present disclosure relates to a pressure bulkhead for an aircraft fuselage having a skin element and having a reinforcement assembly. A pressure bulkhead is most commonly used in the tail section of an aircraft fuselage in order to seal off the cabin, which is exposed to pressure, from the tail section of the aircraft, which is not exposed to pressure, and which has an ambient pressure, which is essentially dependent on the altitude. The pressure bulkhead therefore has a primarily round form, which is adapted to the inner wall of the fuselage, as viewed in the circumferential direction thereof.

BACKGROUND

The skin element has a first surface, a second surface, which is located opposite the first surface, a circumferential edge and a center axis. As such, of the first and second surface, the one surface is oriented towards the pressure side, which is to say, towards the cabin or, respectively, the pressurized cabin, and the other surface is oriented away from the cabin, towards the tail section of the aircraft fuselage. The edge is connected to the aircraft fuselage structure, in which the pressure bulkhead is inserted or is to be inserted, or, respectively, the edge is adapted to the inner circumference of the fuselage structure. The center axis extends approximately perpendicular to the first and second surface and extends parallel to, or approximately parallel to, a longitudinal axis of the aircraft fuselage.

The reinforcement assembly has a plurality of radially disposed reinforcement elements, which extend along the first surface of the skin element and, resting against the skin element, extend in a radial direction between an outer end at the edge of the skin element and an inner end, which faces the center axis. The inner end is thus the end of the radially disposed reinforcement elements, which is closest to the center axis. As such, the inner end may lie on the center axis, for example, as may be the case when a plurality of radially disposed reinforcement elements are connected to one another at the inner ends thereof. A passage opening may be provided in the skin element between the inner ends of the radially disposed reinforcement elements and the center axis, through which opening systems, for example such as cables and hoses or pipes, can be run from the cabin into the tail section.

As viewed in a cross section, which extends radially along the center axis, which is to say, between the outer and inner ends of the radially disposed reinforcement elements, each of the radially disposed reinforcement elements defines a first contour line, and defines a second contour line, which is located opposite the first contour line. In so doing, each contour line extends from the outer end of the radially disposed reinforcement elements, to the inner end thereof. At the same time, the contour lines form outer boundary lines of the radially disposed reinforcement elements. The reinforcement assembly, which is to say, the radially disposed reinforcement elements, rests with the first contour lines thereof on the first surface of the skin element. At the same time, no additional skin element rests along the second contour lines on the reinforcement assembly.

Some pressure bulkheads of this kind, or similar thereto, are known from the prior art. In the case of the pressure bulkhead currently in common use, the skin element, together with the reinforcement elements affixed thereto, have a pronounced, dome-shaped curvature in order to be able to best absorb the pressure load between the cabin pressure and the ambient pressure to which the pressure bulkhead is exposed. As such, the reinforcement elements are disposed in a radial manner on the convex surface of the skin element, wherein the reinforcement elements have a constant thickness along the entire course thereof, which is to say, the distance between the first and second contour line of the elements does not change, whereby the first and second contour lines extend such that they are substantially parallel to one another. The disadvantage with such pressure bulkhead configurations, however, is that on the one hand, the pressure bulkhead takes up a great deal of space due to the pronounced curvature thereof, wherein the space within the curvature is normally not used, for reasons of safety, and on the other hand, the manufacture of the pressure bulkhead as a fiber composite work piece is very complex, since disposing and affixing the reinforcement elements to the convex skin element is very complex.

For this reason, there have been various attempts in the prior art to produce a pressure bulkhead that is not convex, the skin elements of which thus extend in a plane, having no curvature or only an extremely slight curvature.

A pressure bulkhead of this kind, which lacks a curvature, is described in U.S. Pat. No. 6,443,392 B1, which has a flat skin element, which is supported circumferentially along the edge, as well as being supported toward the middle thereof, vis-à-vis the fuselage structure, by a plurality of support members. A pressure bulkhead having such a design requires a large number of components, however, and in particular, reinforcement elements, all of which must be assembled and which involve an undesirable, heavy weight.

Another alternative for a pressure bulkhead having a cross section that has no curvature, is known from US 2009/0242701 A1, wherein a flat skin element is supported by a framework comprising reinforcement elements, which extend perpendicular to one another. A pressure bulkhead having a similar design is also known from US 2014/0124622 A1. In practice, however, such a configuration of the pressure bulkhead has various disadvantages, in particular, increased complexity in the assembly thereof, as well as an undesirable, heavy weight.

A pressure bulkhead having a sandwich construction is known from DE 10 2012 005 451 A1, wherein two skin elements, which are located opposite one another, have a slight curvature in the form of a lens, and hold a foam core between them. Although the lens-shaped cross section has proven to be advantageous with respect to the structural load, which is to say that, due to this construction, the pressure loads can be absorbed and transferred both well and easily, and with a comparatively lightweight design, in the case of a pressure bulkhead having a sandwich construction, which is to say, a construction sealed between two skin elements, it is disadvantageous that the core cannot be easily examined, for example for routine inspections.

Finally, a pressure bulkhead is known from DE 10 2010 018 933 A1, which discloses a flat skin element and a plurality of reinforcement elements, which extend radially, and which rest on the first surface of the skin element. On the side facing away from the skin element, the reinforcement elements have a first contour line, which rises in sections from the center axis, wherein the distance between the first contour line and the second contour line, which rests against the skin element, increases. It has been found, however, that such a discontinuous course of the first contour line, which progresses in sections, does not allow for pressure loads to be optimally absorbed or, respectively, transferred to the fuselage structure. This, in turn has the consequence that the pressure bulkhead must be dimensioned in order to absorb the loads that occur, such that an undesirably large amount of material must be used, and in consequence, this also results in an undesirable, heavy weight.

SUMMARY

It is therefore an object of the present disclosure to provide a pressure bulkhead for an aircraft fuselage that can absorb the pressure loads that occur in as efficient a manner as possible, which is to say, with as little material and weight as possible, and which can transfer the pressure loads to the aircraft fuselage structure.

This object is achieved in that the first and/or second contour lines have a convex course from the outer end in a direction towards the inner end, wherein the distance between the first contour line and the second contour line increases tangent continuously. This does not exclude the provision of additional reinforcement elements, the first or second contour lines of which do not have the shape described above. The idea is thus to design the radially disposed reinforcement elements in such a way that the radial cross section of the elements has a course that is lens-shaped, at least along one of the contour lines thereof, or, respectively, has a course that is partially lens-shaped. How the other contour line is formed and which of the two represents the first contour, which is to say, which of the two contour lines rests against the skin element, can remain open at this point and is the subject matter of various embodiments. In so doing, it may also be provided that the first and/or second contour lines have a curved course in sections, wherein each section has a curvature that differs from that of the adjacent section.

In the case that the radially disposed reinforcement elements have such a form, the pressure load to which the pressure bulkhead is exposed, in particular, the bending torques and shock loads caused by the pressure load, can be particularly effectively absorbed and transferred to the aircraft fuselage structure, so that a minimal material usage, and thus also a minimal weight of the pressure bulkhead, is possible.

In a preferred embodiment, as viewed from the outer end to the inner end, the first and/or the second contour line have the form of a catenary curve. The catenary curve may thereby be defined as follows:

$$y = a \cdot \cosh\left(\frac{x - x_0}{a}\right) + y_0$$

wherein the x axis extends in a radial direction such that it is perpendicular to the center axis, wherein the y axis extends such that it is perpendicular to the x axis and therefore perpendicular to the center axis, wherein a represents an enlargement factor, wherein $x_0$ represents the distance of the vertex to the center axis, and wherein $y_0$ represents the displacement along the center axis. Radially disposed reinforcement elements, which are designed in the form of a catenary curve, can transfer the bending loads and tensile loads that are generated in the reinforcement assembly, which is to say, in the radially disposed reinforcement elements, by the difference in pressure on both sides of the pressure bulkhead, in a particularly effective manner.

In an alternative embodiment, as viewed from the outer end to the inner end, the first and/or the second contour line has the form of a parabola. The shape of the parabola is preferably selected in such a way that the shape approximately corresponds to the course of the bending torque in the pressure bulkhead caused by the difference in pressure on both sides of the pressure bulkhead. Radially disposed reinforcement elements, which may also be designed having the shape of a parabola, can transfer the loads that arise in a particularly effective manner.

In yet an additional embodiment, as viewed from the outer end to the inner end, the first and/or the second contour line has the form of a segment of a circle. Radially disposed reinforcement elements, which may also be designed having the shape of a segment of a circle, can transfer the loads in a particularly effective manner.

According to a preferred embodiment, the first contour line has the convex course extending from the outer end in a direction towards the inner end, in which the distance between the first contour line and the second contour line increases tangent continuously. The second contour line, on the other hand, has a course that is straight, which is to say, not curved. Such an arrangement of the reinforcement assembly with respect to the skin element is suited for absorbing and transferring forces in a particularly effective manner.

According to an alternative embodiment, both the first contour line and the second contour line have the convex course extending from the outer end in a direction towards the inner end, in which the distance between the first contour line and the second contour line increases tangent continuously. Such an arrangement of the reinforcement assembly with respect to the skin element can transfer forces in a particularly effective manner.

In so doing, it is preferred thereby, when the first surface is oriented towards the pressure side of the fuselage, which is to say, towards the cabin. In other words, the skin element is disposed in such a way that the pressure from the cabin is exerted directly on the concave side of the skin element.

According to an alternative embodiment, the second contour line has the convex course extending from the outer end in a direction towards the inner end, in which the distance between the first contour line and the second contour line increases tangent continuously. In so doing, however, the first contour line has a course that is straight, which is to say, not curved. In the case of such an arrangement of the reinforcement assembly with respect to the skin element, loads can be transferred in an especially effective manner.

It is thereby preferred, when an additional reinforcement assembly is provided, which rests against the second surface of the skin element, and which is designed in a manner that is analogous to the reinforcement assembly. In this context, analogous preferably means symmetrical, wherein the skin element defines the axis of symmetry, but may, however, also mean a configuration of the additional reinforcement assembly that is asymmetrical with respect to the reinforcement device. Loads can be transferred in an especially effective manner using an additional reinforcement assembly. It may also preferably be provided that, as viewed in a direction that is parallel to the center axis, the additional reinforcement assembly is not aligned with the reinforcement assembly, since in particular the buckling behavior of the skin element can be improved in this way.

It is thereby also particularly preferred when the second surface is oriented towards the pressure side of the fuselage, which is to say, the cabin. In this way, the pressure from the cabin is exerted in the direction of the convex side of the second contour line, as a result of which, loads can be transferred in a particularly effective manner.

In a preferred embodiment, the reinforcement assembly has one or a plurality of tangentially disposed reinforcement elements, which are preferably spaced evenly apart from one another, and which extend in a tangential direction about a center axis along the first surface of the skin element, and from the first contour line to the second contour line. In so doing, the tangentially disposed reinforcement elements form points of intersection with the radially disposed reinforcement elements, wherein the tangentially disposed reinforcement elements are either affixed to the radially disposed reinforcement elements or are formed as an integral part thereof. With the tangentially disposed reinforcement elements, a plurality of radially disposed reinforcement elements can be connected to one another, and as a result, loads can be better distributed across the entire reinforcement assembly, so that the reinforcement assembly has a more resistant and effective design.

In so doing, it is preferred thereby, when two or more of the points of intersection, at which the radially disposed reinforcement elements and the tangentially disposed reinforcement elements intersect, are interconnected with one another by diagonally disposed reinforcement elements. The diagonally disposed reinforcement elements extend along the first surface of the skin element from the first contour line to the second contour line, and between the radially disposed reinforcement elements and the tangentially disposed reinforcement elements. In so doing, individual radially disposed reinforcement elements or tangentially disposed reinforcement elements may be intersected by the diagonally disposed reinforcement elements at a point lying outside of a point of intersection. Through the combination of the radially disposed reinforcement elements with the tangentially disposed reinforcement elements and the diagonally disposed reinforcement elements, an approximately bionic form is created, as frequently occurs in nature, for example in the case of the leaves of plants such as water lilies. Such a form is particularly resistant and distributes the forces particularly effectively between the radially, tangentially and diagonally disposed reinforcement elements.

In a further preferred embodiment, the pressure bulkhead is at least partially, and preferably, is completely formed of a fiber reinforced composite material, preferably of carbon fiber reinforced material. Alternatively, the pressure bulkhead is at least partially, and preferably, is completely formed of a metallic material, preferably aluminum. In so doing, the pressure bulkhead is preferably designed having a monolithic structure, which is to say, as a single, cohesive, integral component. In the case of a fiber reinforced composite material, for example, this bulkhead may be formed using a "vacuum assisted resin transfer molding" (VaRTM) method, or using prepreg elements that are cured in an autoclave, and in the case of a metallic material, may be milled, for example from a metal block, or formed by "additive layer manufacturing" (ALM). It is also conceivable that the reinforcement assembly, which is to say, in particular, the radially disposed reinforcement elements, can be welded to the skin element, which may be done using a "laser beam welding" method, for example.

In yet a further preferred embodiment, the radially disposed reinforcement elements and/or the tangentially disposed reinforcement elements and/or the diagonally disposed reinforcement elements are designed in the form of T-profiles or preferably in the form of TT-profiles, or also preferably, in the form of TY-profiles. As such, from a mechanical perspective, the TT-profiles and the TY-profiles are preferable to the T-profiles. The TY-profile, in turn, are preferable to the TT-profiles, at least when a fiber reinforced composite material is used, since in the case of the TY-profiles, it is easier to insert and remove the manufacturing core in or, respectively, from between the individual profiles, the manufacturing cores being needed as a support between the individual profiles during the curing process. Alternatively, or in addition, the radially disposed reinforcement elements and/or the tangentially disposed reinforcement elements and/or the diagonally disposed reinforcement elements may also be designed in the form of TL- or C-profiles. It is also preferred that the reinforcement assembly, which is to say, the radially, tangentially and diagonally disposed reinforcement elements, are designed in a sandwich design. As such, the radially, tangentially- and diagonally disposed reinforcement elements then preferably have a closed profile, such as a hat profile or an omega profile, for example.

According to yet another preferred embodiment, a plurality of connection elements for connecting the radially disposed reinforcement elements is provided on the stringer of the aircraft fuselage structure at the outer ends of the radially disposed reinforcement elements. As such, the connection elements may form a part of the outer ends of the radially disposed reinforcement elements or alternatively, may be connected to the outer ends of the radially disposed reinforcement elements. The radially disposed reinforcement elements are preferably designed in such a way that they can be connected to the aircraft fuselage structure, in particular to the stringers, without transferring bending torques, which rotate about a tangential direction, to the aircraft fuselage structure as a result, but instead, only transferring tensile or pressure forces to the aircraft fuselage structure. In so doing, the connection elements preferably form a part of, or an extension of, the inner and outer contour line. In specific embodiments, however, it may also be useful to design the connection elements in such a way that, instead of the above described torque-free connection to the fuselage, a torque-resistant connection to the fuselage is selected, wherein bending torques rotating about a tangential direction are transferred from the pressure bulkhead to the aircraft fuselage structure.

BRIEF DESCRIPTION OF THE DRAWINGS

Exemplary embodiments of the disclosure herein are described in greater detail below on the basis of the drawings.

DETAILED DESCRIPTION

Figure 1:
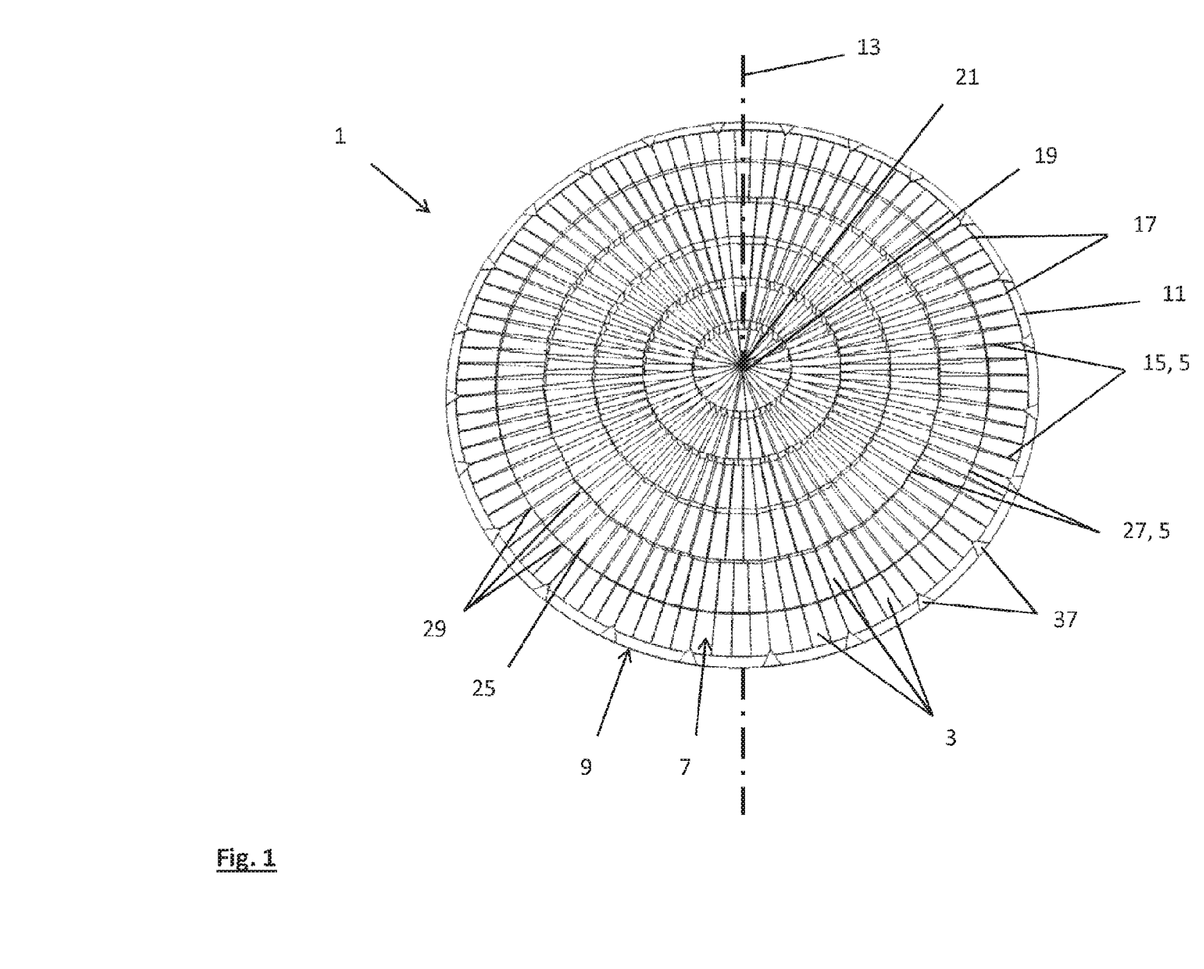
FIG. 1 is a perspective view of an exemplary embodiment of a pressure bulkhead according to the disclosure herein having radially and tangentially disposed reinforcement elements.

FIG. 1 depicts a pressure bulkhead 1 for an aircraft fuselage. The pressure bulkhead 1 has a skin element 3 and a reinforcement assembly 5

The skin element 3 has a first surface 7 and a second surface 9, which is located opposite the first surface 7. In addition, the skin element 3 has a circumferential edge 11, which rests against the inner circumference of an aircraft fuselage, and a center axis 13, which extends such that it is approximately perpendicular to the skin element 3 and approximately parallel to the longitudinal axis of the aircraft fuselage in which the pressure bulkhead 1 is installed.

The reinforcement assembly 5 has a plurality of radially disposed reinforcement elements 15, which extend along the first surface 7 of the skin element 3 and, resting against the element, extend in a radial direction between an outer end 17 at the edge 11 of the skin element 3 and an inner end 19, which faces the center axis 13. The exemplary embodiment shown in FIGS. 1 and 2 has an opening 21 located between the inner end 19 and the center axis 13, for the passage of systems through the pressure bulkhead 1.

Figure 2:
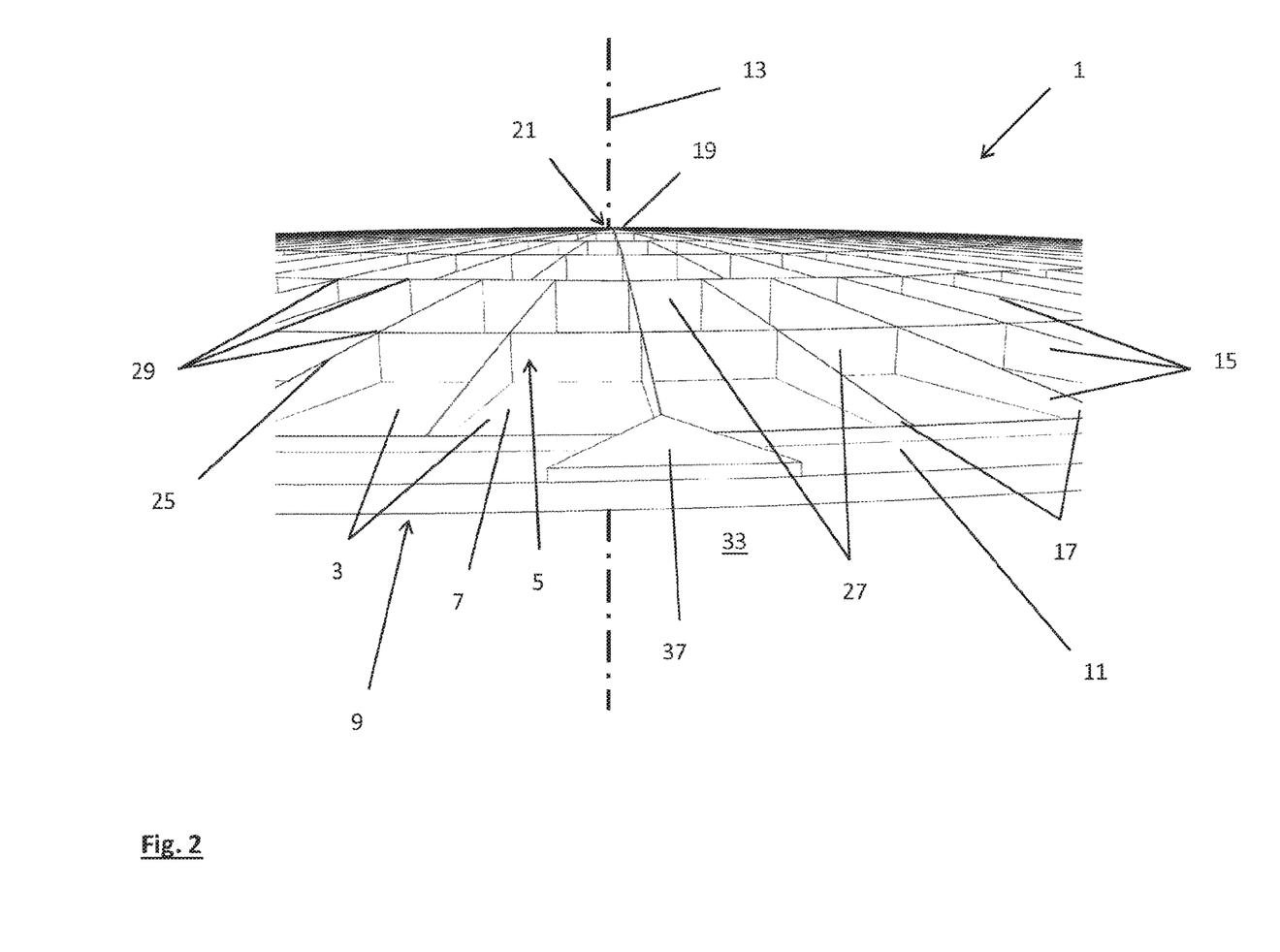
FIG. 2 is a detail of a second perspective view of the pressure bulkhead from FIG. 1.

As viewed in a cross section, which extends radially along the center axis 13, each radially disposed reinforcement element 15 defines a first contour line 23, and defines a second contour line 25, which is located opposite the first contour line 23. Each contour line 23, 25 extends from the outer end 17 to the inner end 19 of the radially disposed reinforcement elements 15. The reinforcement assembly 5 rests, with the first contour lines 23 thereof, on the first surface 7 of the skin element 3. No additional skin element rests against the reinforcement assembly 5 along the second contour line 25, so that the space between the radially disposed reinforcement elements 15 is accessible from this side.

As depicted in FIGS. 1 and 2, in addition to the radially disposed reinforcement elements 15, the reinforcement assembly 5 also has a plurality of tangentially disposed reinforcement elements 27, which are spaced evenly apart from one another, and which extend in a tangential direction about the center axis 13 along the first surface 7 of the skin element 3, and from the first contour line 23 to the second contour line 25, and which thereby form points of intersection 29 with the radially disposed reinforcement elements 15. In the exemplary embodiment in FIGS. 1 and 2, the radially and tangentially disposed reinforcement elements 15, 27 are designed in the form of TY-profiles, however they may also be designed in the form of TT- or T-profiles. In the present exemplary embodiment, the entire pressure bulkhead 1 is formed entirely of a fiber reinforced composite material, specifically carbon fiber reinforced material, but, however, may also be formed of a metallic material.

Figure 6:
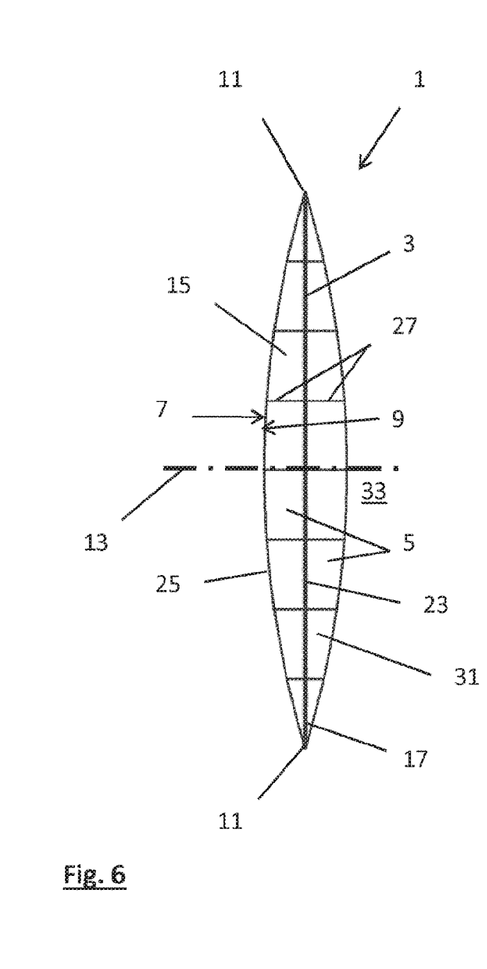
FIG. 6 is a schematic side view of an exemplary embodiment of a pressure bulkhead according to the disclosure herein having a convex second contour line, a straight first contour line as well as an additional reinforcement assembly.

As depicted in FIGS. 3 through 6, generally each of the first and/or second contour lines 23, 25 may have a course, from the outer end 17 in a direction towards the inner end 19, that is convex, in which the distance between the first contour line 23 and the second contour line 25 increases tangent continuously. In the exemplary embodiment depicted in FIGS. 1 and 2, analogous to the exemplary embodiment depicted in FIG. 5, the second contour line 25 has a convex course from the outer end 17 in a direction towards the inner end 19, in which the distance between the first contour line 23 and the second contour line 25 decreases tangent continuously, and wherein the first contour line 23 has a straight course. In addition, as depicted in FIG. 6, a supplementary reinforcement assembly 31 may be provided, which rests against the second surface 9 of the skin element 3, and which is designed in a manner that is analogous, which is to say, symmetrical, to the first reinforcement assembly 5, wherein the skin element 3 defines the axis of symmetry. In the embodiments that are described above and depicted in FIGS. 1, 2, 5 and 6, the pressure bulkhead 1 is installed in an aircraft fuselage or, respectively, provided to be installed therein, in such a way that the second surface 9 of the skin element 3 is oriented towards the pressure side 33 of the aircraft fuselage, which is to say, the cabin. Generally, however, an asymmetric configuration of the additional reinforcement assembly 31 is also possible.

Figure 3:
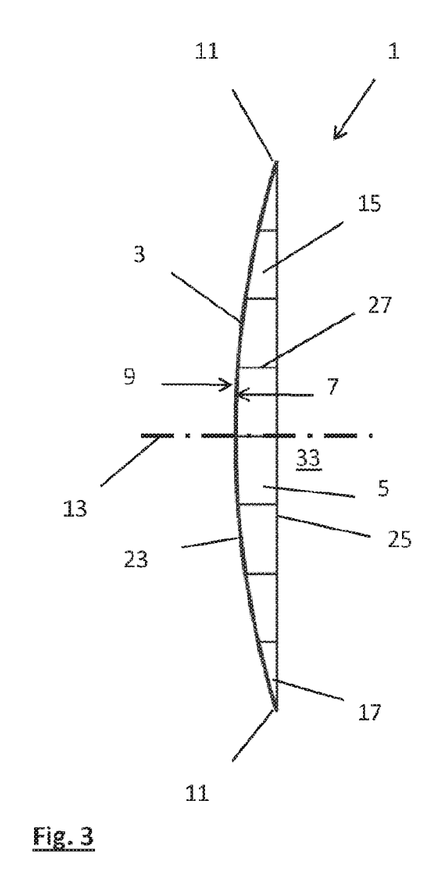
FIG. 3 is a schematic side view of an embodiment of a pressure bulkhead according to the disclosure herein having a convex first contour line and a straight second contour line.
Figure 4:
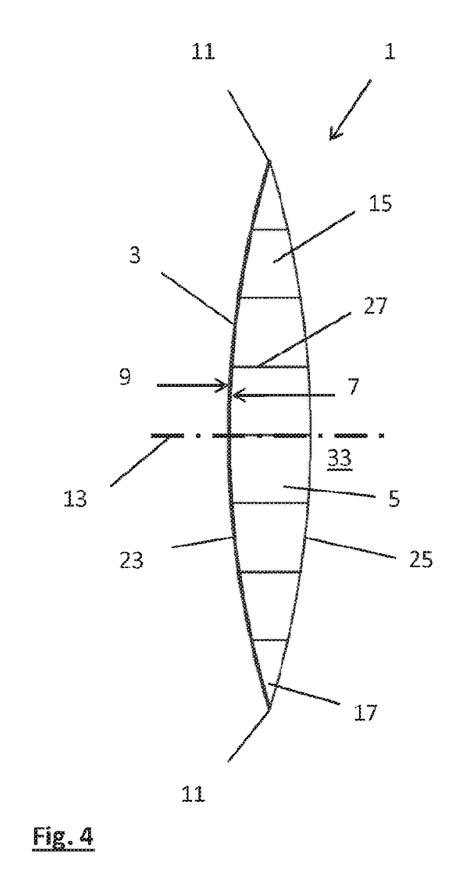
FIG. 4 is a schematic side view of an embodiment of a pressure bulkhead according to the disclosure herein having a convex first and second contour line.
Figure 5:
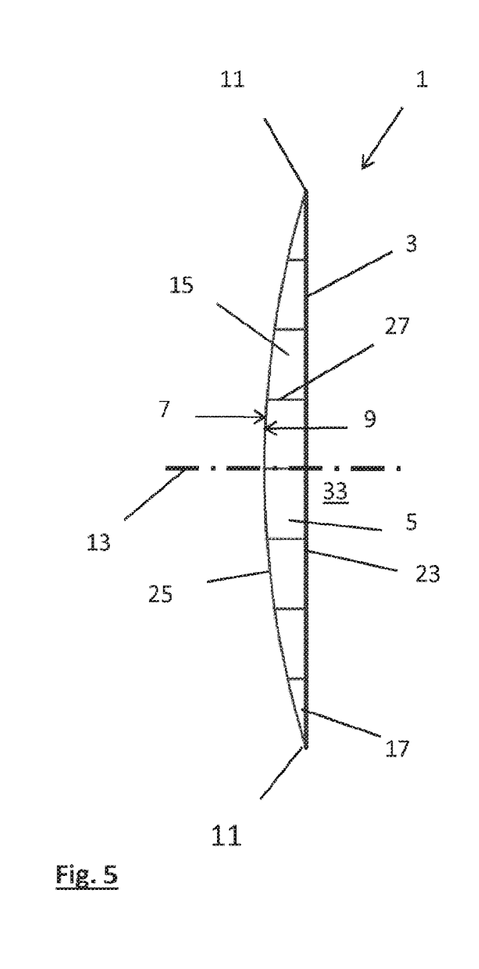
FIG. 5 is a schematic side view of an exemplary embodiment of a pressure bulkhead according to the disclosure herein having a convex second contour line and a straight first contour line.

As an alternative thereto, however, as shown in FIGS. 3 and 4, the first contour line 23 may also have the convex course extending from the outer end 17 in a direction towards the inner end 19, in which the distance between the first contour line 23 and the second contour line 25 tangent continuously increases. In so doing, the second contour line 25 may have a straight course, as shown in FIG. 3, or likewise, may have a convex course extending from the outer end 17 in a direction towards the inner end 19, in which the distance between the first contour line 23 and the second contour line 25 tangent continuously increases, and which is designed such that it is symmetrical to the first contour line 23. In so doing, the first surface 7 of the skin element 3 may be oriented towards the pressure side 33 of the aircraft fuselage, which is to say, the cabin.

In all of the exemplary embodiments shown, as viewed from the outer end 17 to the inner end 19, the first contour line 23 or, respectively, the second contour line 25 has the form of a catenary curve. Alternatively however, as viewed from the outer end to the inner end 17, 19, the first or, respectively, the second contour line 23, 25 may also have the form of a parabola or the form of a segment of a circle.

Figure 7:
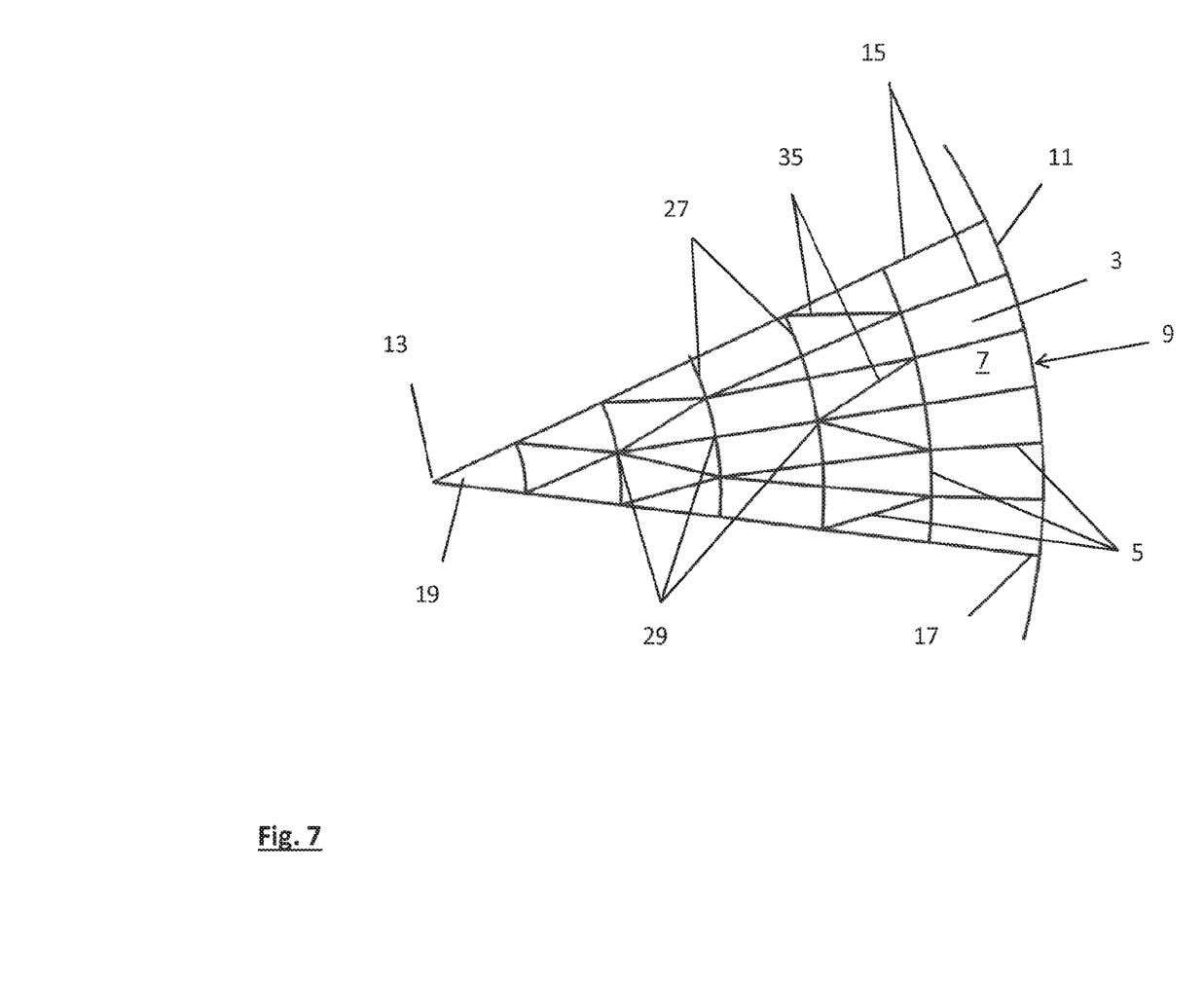
FIG. 7 is a schematic top view of a tangential segment section of an exemplary embodiment of a pressure bulkhead having radially disposed reinforcement elements, tangentially disposed reinforcement elements and diagonally disposed reinforcement elements.

As depicted in FIG. 7, the reinforcement assembly 5 may have additional, diagonally disposed reinforcement elements 35 in order to support the skin element 3 and reinforce the pressure bulkhead 1, which additional, diagonally disposed reinforcement elements connect two or more of the points of intersection 29, at which the radially disposed reinforcement elements 15 and the tangentially disposed reinforcement elements 27 intersect. The diagonally disposed reinforcement elements 35 extend along the first surface 7 of the skin element 3 from the first contour line 23 to the second contour line 25 and extend between the radially disposed reinforcement elements 15 and the tangentially disposed reinforcement elements 27.

As depicted in FIG. 1 and FIG. 2, a plurality of connection elements 37 for connecting the radially disposed reinforcement elements 15 is provided on the stringer of an aircraft fuselage structure, in which the pressure bulkhead 1 installed or is to be installed, at the outer ends 17 of the radially disposed reinforcement elements 15. In so doing, the connection elements 37 are formed as part of the outer ends 17 of the radially disposed reinforcement elements 15, and therefore likewise extend along the first and second contour line 23, 25.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead for an aircraft fuselage, comprising:
   a skin element comprising a first surface and a second surface that is located opposite the first surface, and a circumferential edge and a center axis; and
   a reinforcement assembly comprising a plurality of radially disposed reinforcement elements that extend along the first surface of the skin element in a radial direction between an outer end at the edge of the skin element and an inner end, which faces the center axis;
   wherein, as viewed in a cross section, which extends radially along the center axis, each of the radially disposed reinforcement elements defines a first contour line and a second contour line, which is located opposite the first contour line, wherein each contour line extends from the outer end of the radially disposed reinforcement elements to the inner end thereof,
   wherein the reinforcement assembly rests with the first contour lines thereof on the first surface of the skin element, and
   wherein one of the first or second contour lines has a convex course extending from the outer end in a direction towards the inner end and all the way to the center axis, in which course a distance between the first contour line and the second contour line increases continuously.

2. The pressure bulkhead according to claim 1, wherein, as viewed from the outer end to the inner end, the first or the second contour lines have a form of a catenary curve.

3. The pressure bulkhead according to claim 1, wherein, as viewed from the outer end to the inner end, the first or the second contour lines have a form of a parabola.

4. The pressure bulkhead according to claim 1, wherein, as viewed from the outer end to the inner end, the first or the second contour lines have form a segment of a circle.

5. The pressure bulkhead according to claim 1, wherein the first contour lines have the convex course extending from the outer end in a direction towards the inner end, in which course the distance between the first contour lines and the second contour lines increases continuously, and wherein the second contour lines have a straight course.

6. The pressure bulkhead according to claim 5, wherein the first surface of the skin element is oriented towards a pressure side of the aircraft fuselage.

7. The pressure bulkhead according to claim 1, wherein both the first contour lines and the second contour lines have the convex course extending from the outer end in a direction towards the inner end, in which course the distance between the first contour lines and the second contour lines increases continuously.

8. The pressure bulkhead according to claim 7, wherein the first surface of the skin element is oriented towards the pressure side of the aircraft fuselage.

9. The pressure bulkhead according to claim 1, wherein the second contour lines have the convex course extending from the outer end in a direction towards the inner end, in which course the distance between the first contour lines and the second contour lines increases continuously, and wherein the first contour lines have a straight course.

10. The pressure bulkhead according to claim 9, wherein an additional reinforcement assembly is provided, which rests against the second surface of the skin element, and which is designed in a manner that is analogous to the reinforcement assembly.

11. The pressure bulkhead according to claim 9, wherein the second surface of the skin element is oriented towards the pressure side of the aircraft fuselage.

12. The pressure bulkhead according to claim 1, wherein the reinforcement assembly has one or a plurality of tangentially disposed reinforcement elements, which extend in a tangential direction about the center axis along the first surface of the skin element, and from the first contour line to the second contour line, and which thereby form points of intersection with the radially disposed reinforcement elements.

13. The pressure bulkhead according to claim 12, wherein two or more points of intersection, at which the radially disposed reinforcement elements and the tangentially disposed reinforcement elements intersect, are interconnected with one another by diagonally disposed reinforcement elements, which extend along the first surface of the skin element from the first contour line to the second contour line, and extend between the radially disposed reinforcement elements and the tangentially disposed reinforcement elements.

14. The pressure bulkhead according to claim 1, wherein the pressure bulkhead is formed at least partially of a fiber reinforced composite material or at least partially of a metallic material.

15. The pressure bulkhead according to claim 1, wherein the radially disposed reinforcement elements or the tangentially disposed reinforcement elements or the diagonally disposed reinforcement elements are designed in a form of T-profiles or in a form of TT-profiles or in a form of TY-profiles.

16. The pressure bulkhead according to claim 1, wherein a plurality of connection elements is provided at the outer ends of the radially disposed reinforcement elements, wherein the connection elements form a part of the outer ends of the radially disposed reinforcement elements or are connected to the outer ends of the radially disposed reinforcement elements.

* * * * *